United States Patent Office 3,322,145
Patented May 30, 1967

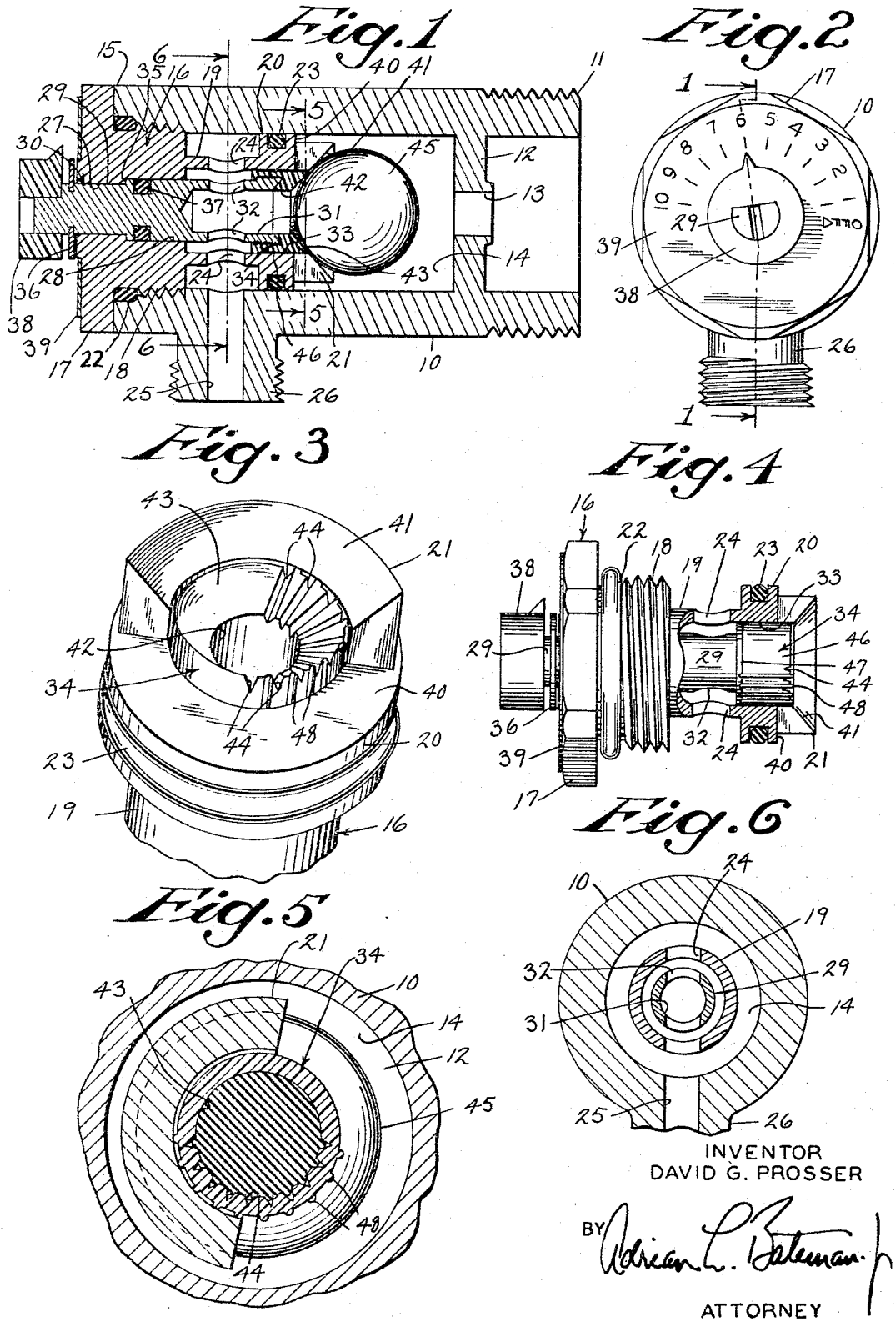

3,322,145
ADJUSTABLE CONSTANT FLOW VALVE
David G. Prosser, Milwaukee, Wis., assignor to Autotrol Corporation, Milwaukee, Wis., a corporation of Wisconsin
Filed Nov. 2, 1964, Ser. No. 408,055
13 Claims. (Cl. 137—517)

This invention relates to an adjustable constant flow valve, and more particularly resides in a valve which may be set for a desired one of a plurality of available rates of fluid flow though the valve and which will maintain such set rate of flow constant even though the pressure of incoming fluid to the valve varies.

Valves that will maintain a constant quantity of fluid flow per unit time are known in the art. One form of such constant flow valves utilizes a molded rubber insert provided with an opening that responds to the pressure of incoming fluid. That is, the area of the opening varies in inverse proportion to the pressure of incoming fluid so that the quantity of fluid passing through the opening is the same for each fixed time interval. If it is desired to alter the rate of flow to be controlled, it is necessary to either substitute a new valve having the desired rate capacity or to substitute an insert having a different rate of flow characteristic. Obviously, such constant flow valves are not equipped for ready adjustment of the rate of flow which is to be maintained constant.

A valve that is capable of maintaining a plurality of constant rates of flow with integral means for selecting the rate of flow to be controlled could be advantageously employed in numerous applications. A specific example of a field of use for such an adjustable constant flow valve is found in the water softener industry. Water softeners require periodic circulation of a salt solution through the water softener to recharge the same. In water softeners in which the recharging function is performed automatically, it is common for the brine to be run through the water softener at fixed intervals of a week or less in the case of residential use. The quantity of salt to be circulated for periodic recharging will vary with the needs of the user. If the recharging cycle is to be accomplished within a fixed time limit, means which can be adjusted to the user's needs must be provided to control the total amount of brine which is used during the cycle. This function may be advantageously accomplished by an adjustable constant flow valve in accordance with the present invention which may be set for a rate of flow over a fixed time limit consistent with the user's recharging requirements. Once adjusted, the valve will maintain the constant rate of flow even though the pressure of the incoming brine will vary, and the necessary quantity of salt is therefore delivered to the water softener.

It is one object of this invention to provide an adjustable constant flow valve.

It is another object of this invention to provide a valve incorporating a plurality of selectable rates of flow with integral means for selecting a desired rate of flow which is to be maintained constant.

It is a further object of this invention to provide such a valve in which selection of a desired rate of flow is accomplished without disassembly of the valve and without substitution or addition of structural elements.

It is also an object of this invention to provide an adjustable constant flow valve which is simple in construction, which may be adjusted without the use of special tools or skills, and which is economical to manufacture.

A valve in accordance with the present invention generally includes a valve body having a fluid inlet and outlet, a fluid passage which forms the sole fluid connection between the inlet and outlet and including discrete control passage means, and a member disposed within the valve body that is responsive to the pressure of incoming fluid to seat against the control passage means. One of the control passage means and the fluid pressure responsive member are deformable so that such member closes off a portion of the cross sectional area of the control passage means, and such obstruction increases in direct proportion to the increase in fluid passage so that the control passage opening will vary inversely with the fluid pressure and thereby maintain a constant flow through the valve. Adjustment of the valve is provided by means which closes off portions of the control passage means to select an initial passage opening consistent with the desired rate of flow.

The foregoing and other objects of the invention will appear in the description which follows. In the description reference is made to the accompanying drawings which form a part hereof and in which there is shown a specific embodiment of the invention. This embodiment will be described in detail to enable those skilled in the art to appreciate its construction and operation. Obviously, other embodiments of the invention may be made and structural changes may be made in the embodiment illustrated without departing from the scope of the invention; consequently, the scope of the invention is best defined by the appended claims.

In the drawings:

FIG. 1 is a view in vertical section of a valve in accordance with the present invention;

FIG. 2 is a view in elevation of the left end of the valve of FIG. 1;

FIG. 3 is a view in perspective of a valve head and seat of the valve of FIG. 1 and looking along one fluid passage groove of the valve head;

FIG. 4 is a side view in elevation of the valve head and seat with portions of the seat broken away to show the valve head;

FIG. 5 is a view in section taken in the plane of the line 5—5 of FIG. 1; and

FIG. 6 is a view in section taken in the plane of the line 6—6 of FIG. 1.

Referring to the drawings, the illustrated embodiment of the valve of this invention includes a valve body 10 having one end 11 externally threaded for connection to a conduit for incoming fluid. A partition 12 is formed integral with the valve body 10 adjacent the end 11 and includes a central inlet opening 13. The inlet 13 leads to a chamber 14 formed by the hollow interior of the valve body 10. The valve body 10 is internally threaded at its opposite open end 15 to receive a valve seat member 16. The seat member 16 generally includes a hexagonal flange 17 which abuts against the open end 15 of the valve body 10, a threaded shank portion 18 which is received within the internal threads in the body 10, an extending hollow stem 19 which merges into a sealing flange 20, and a valve seat portion 21 projecting from the sealing flange 20.

The valve seat member 16 is sealed with the interior of the valve body 10 by an O-ring 22 disposed adjacent the hexagonal flange 17 and a second O-ring 23 mounted in an annular recess in the sealing flange 20. The hollow stem portion 19 of the valve seat member 16 is provided with transverse holes 24 which, when the valve seat member 16 is disposed within the valve body 10, are aligned with an outlet opening 25 extending transversely through the valve body 10. An outlet portion 26 having external threads is provided integral with the valve body 10 for connection with a conduit for outgoing fluid.

The hexagonal flange 17 and the shank portion 18 of the valve seat member 16 are provided with concentric bores 27 and 28 which receive a stem 29 of a regulator member 30. The interior end of the stem 29 is provided with a re-entrant bore 31 which leads to radial holes 32 in the stem 29 at the position of the holes 24 in the valve seat member 16. The valve seat portion 21 and sealing flange 20 are provided with a central opening 33 which is adapted to receive a valve head 34 mounted on the stem 29.

The stem 29 is adapted for rotation within the seat member 16 and includes a built-up shoulder 35 which, in the assembled position, seats against an abutment formed by the unequal bores 27 and 28. When so seated, the stem 29 is held in place by a snap ring 36. The stem 29 is sealed with the bore 28 by an O-ring 37. The end of the stem 29 which projects beyond the hexagonal flange 17 mounts a pointer 38 which cooperates with a dial 39 provided on the exterior surface of the hexagonal flange 17. As will appear more fully hereafter, the pointer 38 and dial 39 cooperate for setting the constant fluid flow which it is desired to maintain.

The sealing flange 20 of the seat member 16 has a face 40 that opposes the inlet 13 and the valve seat portion 21 projects from such face 40 about only a portion of the central opening 33. As may be seen in FIG. 3, the valve seat portion 21 has a sweep of approximately 180° about the central opening 33 of the valve seat member 16. The valve seat portion 21 is provided with an inner sealing surface 41 that opposes the inlet 13 and which slopes inwardly toward the central opening 33. The sealing surface 41 is preferably developed as a surface of a cone having its axis coinciding with the longitudinal axis of the valve seat member 16.

The valve head 34 may be formed by molding a synthetic plastic, such as polyethylene, about the interior end of the stem 29. The valve head 34 is formed with a central fluid port 42 which acts as a continuation of the re-entrant bore 31 in the stem 29. The head 34 also has an inner sealing surface 43 which is inclined inwardly to the fluid port 42 and is preferably developed as a surface of a cone so that it forms a continuation of the sealing surface 41 of the valve seat portion 21. A plurality of axially and radially directed grooves 44 are provided in the sealing surface 43 of the head 34 at equally spaced intervals. The grooves 44 are provided within an area of the sealing surface 43 which is somewhat less than the sweep of the valve seat portion 21. The grooves 44 are triangular in shape and of constant cross section along their length. In FIG. 3, one of the grooves 44 is viewed from an end.

A deformable pressure responsive member, which takes the form of a natural or synthetic rubber ball 45 in the illustrated embodiment is disposed within the chamber 14 of the valve body 10 and is adapted to seat against the sealing surface 41 of the valve seat portion 21 and the exposed sealing surface 43 of the valve head 34 under the pressure of fluid entering the inlet 13. For positive sealing, the ball 45 is preferably of a size that it will be tangent to the inner edge of the sealing surface 41 of the valve seat portion 21 when the ball is undeformed.

The outer cylindrical surface 46 of the head 34 is of slightly less diameter than that of the central opening 33 in the seat portion 21 and sealing flange 20. At the base of the head 34, a sealing flange 47 is formed about the periphery of the outer surface 46. When the head 34 is in place within the central opening 33 this sealing flange 47 is compressed to seal the perimeter of the head 34 with the central bore 33 against the axial leakage of fluid. Longitudinal ribs 48 are also formed integral with the head 34 on the outer surface 46 and each extends from the sealing flange 47 to a point beyond the normal limit of the outer surface 46 so that the inner sealing surface 43 is continuous to the tips of the ribs 48. There are ten longitudinal ribs 48 one disposed behind, as far as the direction of rotation of the regulator member 30 is concerned, each groove 44 and more towards the succeeding groove than the advancing groove. Those ribs 48 which are disposed within the central opening 33 are also compressed to seal the head 34 with the central opening 33 against peripheral fluid flow about the outer surface 46 of the head 34. When properly disposed within the valve seat member 21, the tips of the ribs 48 extend to the inner edge of the sealing surface 41 of the seat member 21.

In general, the operation of the valve is as follows: a desired rate of flow which is to be maintained constant is first selected and set by rotating the regulator member 30 within the valve seat member 16 to expose one or more of the grooves 44 consistent with the rate of flow to be maintained. The incoming fluid entering the inlet opening 13 seats the ball 45 against the inner edge of the sealing surface 41 of the valve seat portion 21 and also against the exposed portion of the head 34. Fluid is permitted to flow through the grooves 44 which are exposed beyond the valve seat portion 21 to enter the port 42 and then pass through the holes 32 and 24 to the outlet opening 25. As the pressure of the incoming fluid increases, the ball 45 will be forced to a greater extent against the valve head 34 and will extend to a greater extent within each of the exposed grooves 44, as shown in FIG. 5, to reduce the cross sectional area of the grooves 44 and thereby reduce the opening for the flow of the fluid at the higher pressure with the result that the rate of flow is constant. A decrease in the pressure of incoming fluid will have the opposite effect.

More specifically, the dial 39 is calibrated from one to ten which may represent, for example, the number of pounds of salt which will be introduced during a fixed time for recharging a water softener. When the pointer 38 is set at the "off" position shown in FIG. 2, the grooves 44 are disposed entirely within the seat portion 21. Under such circumstances, the incoming fluid pressure will seat the ball 45 against the sealing surface 41 of the valve seat portion 21 and against the exposed ungrooved sealing surface 43 of the head 34 to completely seal against the passage of the fluid to the outlet opening 25. Therefore in such a setting there is zero flow through the valve.

If the valve is now set by rotating the regulator member 30 until the pointer 38 lines up with the number six indicia on the dial 39, this action will expose six of the grooves 44. That is, six of the grooves 44 will be free of the seat portion 21. The incoming fluid will then seat the ball 45 against the sealing surface 41 of the seat portion 21 to seal off those grooves 44 which are unexposed, and will also seat the ball 45 against the exposed ungrooved sealing surface 43 of the head 34 and across the tops of the grooves 44. Fluid is then permitted to flow only through the exposed grooves 44 and along their length. The unexposed grooves are sealed by the seating of the ball 45 upon the sealing surface 41. The ungrooved portion of the sealing surface 43 of the head 34 is likewise contacted by the ball 45. Axial flow about the outer surface 46 of the head 34 is prevented by the sealing flange 47. Furthermore, as can be seen in FIG. 5, a sealing rib 48 is compressed against the central opening 33 in the seat portion 21 to prevent the flow of fluid about the periphery of the head 34 and to the unexposed grooves where it might enter the port 42.

Once the desired setting has been made, the rate of flow through the valve will be maintained constant as previously indicated by the closing of a greater cross sectional area of the exposed grooves 44 under increasing pressure and a corresponding closing of a smaller cross sectional area of the grooves 44 under lower incoming fluid pressure.

While the preferred embodiment utilizes a deformable ball 45 as the pressure responsive member, a non-deformable pressure responsive member could be used in combination with a deformable valve head 34 and the change in the open cross sectional area of the grooves 44 inversely with change in fluid pressure will still follow. Furthermore, the grooves 44 need not be triangular in cross section for the valve to function.

It will be seen from the above that the applicant has provided an efficient and simple valve which will maintain a constant rate of flow and which can be adjustable for various rates of flow within its capacity. Adjustment of the valve can be accomplished even by unskilled users without disassembly of the valve.

I claim:

1. An adjustable constant flow valve comprising: a valve body including an inlet and an outlet; means forming discrete control passage means within said valve body; a fluid pressure responsive member disposed within said valve body and responsive to the flow of incoming fluid to seat against said control passage means, said control passage means having an open cross sectional area for the flow of fluid from said inlet to said outlet when said member is seated thereagainst, one of said control passage means and said member being deformable whereby said open cross sectional area is reduced in direct proportion to the pressure of incoming fluid; and means for obstructing a selectable portion of said open cross sectional area to adjust the rate of fluid to be maintained.

2. An adjustable constant flow valve comprising: a valve body including an inlet and an outlet; a valve member within said valve body, said valve member including discrete control passage means forming the sole fluid connection between said inlet and outlet; a fluid pressure responsive member disposed within said valve body and responsive to the flow of incoming fluid to seat generally transversely against said control passage means, one of said control passage means and said pressure responsive member being deformable whereby the open area of said control passage means is reduced in direct proportion to the pressure of incoming fluid; and settable means for obstructing a selectable portion of said control passage means to adjust the rate of fluid flow to be maintained.

3. An adjustable constant flow valve comprising: a valve body including an inlet and an outlet; a valve member disposed within said valve body and sealed therewith; said valve member having means forming a fluid passage in said valve member to constitute the sole connection for the passage of fluid from said inlet to said outlet and including discrete control passage means; settable means for obstructing selectable portions of said control passage means to adjust the same for an effective open area for the flow of fluid; and a deformable member disposed within said valve body between said inlet and said valve member and responsive to the flow of incoming fluid to seat against said control passage means and thereby to reduce the effective open area of said control passage means in direct proportion to the pressure of incoming fluid, whereby the rate of fluid flow selected by said settable means will be maintained constant under varying fluid pressures.

4. An adjustable constant flow valve comprising: a valve body including an inlet and an outlet; means forming a plurality of discrete control passages within said valve body; a fluid pressure responsive member disposed within said valve body and responsive to the flow of incoming fluid to seat against said plurality of control passages, said control passages each having an open cross sectional area for the flow of fluid when said pressure responsive member is seated thereagainst, one of said control passages and said pressure responsive member being deformable whereby said pressure responsive member closes a greater portion of said open area as the pressure of incoming fluid increases, whereby a constant rate of flow through said passages is maintained without regard to the pressure of incoming fluid; and means within said valve body adapted to close a selectable number of said control passages to vary the number of passages open for the passage of fluid and thereby to adjust the rate of flow to be maintained constant.

5. An adjustable constant flow valve comprising: a hollow valve body including an inlet and an outlet; a valve member disposed within said valve body, said valve member including means forming a fluid passage in said valve member connecting said inlet and outlet and including a plurality of discrete control passages; means sealing said valve member with the interior of said valve body; a deformable member disposed within said valve body between said inlet and said control passages, said deformable member being adapted to seat against said control passages under the flow of fluid entering said inlet so that said control passages are the sole fluid connection between said inlet and outlet, said deformable member closing a greater portion of said passages as the pressure of the incoming fluid increases, whereby a constant rate of flow through said passages in maintained without regard to said pressure; and settable means within said valve body adapted to seal with said deformable member to close off a selectable number of said control passages to vary the number of passages open for the passage of fluid and thereby to adjust the rate of flow to be maintained constant.

6. An adjustable constant flow valve comprising: a hollow valve body having an inlet and an outlet; a valve member disposed within said valve body and including a valve head disposed between said inlet and outlet, said valve member having a fluid port leading from said valve head to communicate with said outlet, said valve head having a surface on the inlet side thereof which is inclined inwardly toward said fluid port and which is provided with a plurality of spaced grooves; means sealing the periphery of said valve head with the interior of said valve body; a ball member disposed within said valve body and adapted to seat against said surface in response to the flow of fluid entering said inlet, one of said valve heads and said ball member being deformable so that said ball member closes a portion of each of said grooves in direct relation with an increase in incoming fluid pressure; and seat means surrounding a portion of said head to seat with said ball member and close a selectable number of said grooves so that the number of said grooves which are open for the passage of fluid may be adjusted.

7. An adjustable constant flow valve compirsing: a hollow valve body having an inlet and an outlet; a valve member disposed within said valve body and including a valve head disposed between said inlet and outlet, said valve member having a fluid port leading from said valve head to communicate with said outlet, said valve head having an inner surface opposing said inlet which is inclined inwardly toward said fluid port and which is provided with a plurality of spaced axially directed grooves; means sealing the periphery of said valve head with the interior of said valve body; a deformable ball disposed within said valve body and adapted to seat against said inner surface partially within said grooves under the influence of fluid entering said inlet so that said grooves are the sole fluid connection between said inlet and outlet, said ball closing a greater portion of said grooves under increasing incoming fluid pressure; and seat means surrounding a portion of said head to seat with said deformable ball, said valve head adapted for rotation in said seat means whereby a selectable number of said grooves may be closed to adjust the rate of flow to be maintained constant.

8. An adjustable constant flow valve comprising: a hollow valve body having an inlet and an outlet; a valve seat member sealed with the interior surface of said valve body between said inlet and outlet and having a central bore, said valve seat member including an upstanding valve seat opposing said inlet and disposed about said central bore; a valve head received within said central bore and having a surface on the inlet side thereof that is inwardly inclined toward a central fluid port provided in said head, said surface of said head being provided with a plurality of spaced axially directed grooves, a portion of said valve seat being removed and said head being rotatable within said valve seat whereby the ends of a selectable number of said grooves may be exposed beyond said valve seat; and a deformable ball disposed within said valve body and adapted to seat against said valve seat and the exposed portion of said surface of said head to obstruct a portion of the exposed grooves in direct proportion to the pressure of incoming fluid.

9. An adjustable constant flow valve comprising: a hollow valve body having an inlet and an outlet; a valve seat member disposed within said valve body and sealed with the interior thereof, said valve seat member including a face opposing said inlet and a valve seat projecting outwardly from said face over a portion thereof, said valve seat member having a central bore leading from said face and said valve seat and communicating with said outlet port; a valve member in said central bore and including a valve head projecting beyond said face within the limits of said valve seat, said head having a central fluid port for fluid flow to said outlet port; said valve seat and said head having inwardly inclined surfaces opposing said inlet with said surface of said head forming a continuation of said surface of said valve seat, said head having its surface provided with a plurality of spaced V-shaped inwardly directed grooves over a portion of the periphery of said surface, said head being journaled for rotation in said valve seat member whereby a selectable number of said groove smay be exposed beyond said valve seat; and a deformable ball disposed within said valve body and adapted to seat against said valve seat and the exposed portion of said surface of said head to obstruct a portion of the exposed grooves in direct proportion to the fluid pressure.

10. An adjustable constant flow valve comprising: a hollow valve body having an inlet and an outlet; a valve seat member disposed within said valve body and including a flange sealed with the interior of said valve body, said flange having a face opposing said inlet and a valve seat projecting outwardly from said face over only a portion of said face, said valve seat member including a central bore leading from said valve seat and said face to fluid passages opposing said outlet, said valve seat having an inwardly directed conical surface opposing said inlet; a valve member journaled for rotation in said central bore and including a valve head projecting beyond said face within the confines of said valve seat, said head having a central fluid port communicating with said central bore for fluid flow through said head to said outlet, said head having an inwardly directed conical surface forming a continuation of said surface of said valve seat, said surface of said head being provided with a plurality of spaced V-shaped grooves over a portion of its perimeter within the limits of the sweep of said valve seat, said valve being adjusted by rotating said valve member to expose one or more of said plurality of grooves byeond said valve seat in accordance with the rate of flow desired to be held constant; and a deformable ball disposed within said valve body and adapted to seat against the inner edge of said surface of said valve seat and the exposed portion of said surface of said head whereby the sole passage for fluid flow from said inlet to said outlet is along the exposed grooves, said deformable ball reducing the open area of the exposed grooves in direct proportion to the pressure of incoming fluid whereby the selected rate of flow will be maintained constant.

11. An adjustable constant flow valve in accordance with claim 10 wherein said head has an outer cylindrical surface provided with a peripheral sealing flange to seal said head with said central bore against axial flow of fluid about said head, and a plurality of spaced axially directed sealing ribs disposed between spaced grooves to seal with said valve seat to prevent peripheral fluid flow from the exposed outer cylindrical surface of said head to the grooves disposed within said valve seat.

12. An adjustable constant flow valve comprising: a hollow valve body having an inlet at one end and an outlet intermediate its ends, a valve seat member disposed within said valve body and including a flange sealed with the interior of said valve body, said flange having a face opposing said inlet and a valve seat projecting outwardly from said face over only a portion of said face, said valve seat member including a central bore leading from said valve seat and said face to said outlet, said valve seat having an inwardly inclined conical surface opposing said inlet; a valve member journaled for rotation in said valve seat member and including a stem projecting outwardly of the other end of said valve body and a valve head projecting beyond said face within the confines of said valve seat, said head having a central fluid port communicating with said central bore for fluid flow through said head to said outlet, said head having an inwardly inclined conical surface forming a continuation of said surface of said valve seat, said surface of said head being provided with a plurality of spaced V-shaped grooves over a portion of its perimeter within the limits of the sweep of said valve seat, one or more of said plurality of grooves being adapted to be exposed beyond said valve seat to adjust the rate of fluid flow to be held constant; and a deformable ball disposed within said valve body and adapted to seat against the inner edge of said surface of said valve seat and the exposed portion of said surface of said head whereby the sole passage for the fluid flow from said inlet to said outlet is along the exposed grooves, said deformable ball varying the open area of the exposed grooves inversely with changes in the pressure of incoming fluid.

13. An adjustable constant flow valve in accordance with claim 12 wherein the projecting end of said stem mounts pointer means and an indicia bearing dial is provided on the exterior of said other end of said valve body to cooperate with said pointer means to give a visual indication of the number of grooves exposed and thereby of the rate of flow to be maintained.

References Cited
UNITED STATES PATENTS

| | | | |
|---|---|---|---|
| 2,732,859 | 1/1956 | Chace | 137—517 |
| 2,762,397 | 9/1956 | Miller | 138—43 |
| 3,139,114 | 6/1964 | Benzel | 138—45 |

WILLIAM F. O'DEA, *Primary Examiner.*

W. H. WRIGHT, *Assistant Examiner.*